US012634962B2

(12) United States Patent
Lei

(10) Patent No.: US 12,634,962 B2
(45) Date of Patent: May 19, 2026

(54) METHOD AND APPARATUS FOR DCI FORMAT INDICATION OF MULTICAST TRANSMISSION

(71) Applicant: Lenovo (Beijing) Limited, Beijing (CN)

(72) Inventor: Haipeng Lei, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 367 days.

(21) Appl. No.: 18/271,085

(22) PCT Filed: Jan. 15, 2021

(86) PCT No.: PCT/CN2021/072134
§ 371 (c)(1),
(2) Date: Jul. 6, 2023

(87) PCT Pub. No.: WO2022/151346
PCT Pub. Date: Jul. 21, 2022

(65) Prior Publication Data
US 2024/0015769 A1     Jan. 11, 2024

(51) Int. Cl.
*H04W 72/30*     (2023.01)
*H04L 1/1867*     (2023.01)
*H04L 12/18*      (2006.01)
*H04W 72/121*     (2023.01)
*H04W 72/1273*    (2023.01)

(52) U.S. Cl.
CPC ........... *H04W 72/30* (2023.01); *H04L 1/1887* (2013.01); *H04L 12/1868* (2013.01); *H04W 72/121* (2013.01); *H04W 72/1273* (2013.01)

(58) Field of Classification Search
CPC ............... H04W 72/30; H04W 72/121; H04W 72/1273; H04L 1/1887; H04L 12/1868
See application file for complete search history.

(56) References Cited

U.S. PATENT DOCUMENTS

| | | | |
|---|---|---|---|
| 2016/0014752 A1* | 1/2016 | Papasakellariou | .... H04L 5/0076 370/329 |
| 2020/0022144 A1* | 1/2020 | Papasakellariou | ......................... H04W 72/0453 |

(Continued)

FOREIGN PATENT DOCUMENTS

| | | | |
|---|---|---|---|
| CN | 107210903 A | 9/2017 | |
| WO | 2020064311 A1 | 4/2020 | |
| WO | WO-2020166627 A1 * | 8/2020 | ............ H04W 72/04 |

OTHER PUBLICATIONS

PCT/CN2021/072134 , "International Preliminary Report on Patentability", PCT Application No. PCT/CN2021/072134, Jul. 27, 2023, 6 pages.

(Continued)

*Primary Examiner* — Afshawn M Towfighi
(74) *Attorney, Agent, or Firm* — FIG. 1 Patents

(57) ABSTRACT

Embodiments of the present disclosure relate to multicast transmissions. According to some embodiments of the disclosure, a method may include: receiving a downlink control information (DCI) format for scheduling a physical downlink shared channel (PDSCH); determining, based on the DCI format, whether the PDSCH is scheduled for a group of UEs including the UE or specifically for the UE; and decoding the scheduled PDSCH.

20 Claims, 5 Drawing Sheets

(56)  References Cited

U.S. PATENT DOCUMENTS

| | | | | |
|---|---|---|---|---|
| 2022/0360385 | A1* | 11/2022 | Fu | .......................... H04L 5/0044 |
| 2024/0015769 | A1* | 1/2024 | Lei | ....................... H04W 72/30 |

OTHER PUBLICATIONS

PCT/CN2021/072134 , "International Search Report and Written Opinion", PCT Application No. PCT/CN2021/072134, Oct. 12, 2021, 7 pages.

Vivo , "Discussion on HARQ operation for NR-U", 3GPP TSG RAN WG1 Meeting #96bis, R1-1904067, Xi'an, China [retrieved Jun. 12, 2023]. Retrieved from the Internet <https://www.3gpp.org/ftp/TSG_RAN/WG1_RL1/TSGR1_96b/Docs/?sortby-sizerev>., Apr. 12, 2019, 7 pages.

* cited by examiner

300 receiving a DCI format for scheduling a PDSCH — 311 determining, based on the DCI format, whether the PDSCH is scheduled for a group of UEs including the UE or specifically for the UE — 313 decoding the scheduled PDSCH — 315

400 determining whether to transmit data specifically to a first UE or to a group of UEs including the first UE — 411 generating a DCI format for scheduling a PDSCH — 413 transmitting the DCI format and the scheduled PDSCH — 415

METHOD AND APPARATUS FOR DCI FORMAT INDICATION OF MULTICAST TRANSMISSION

TECHNICAL FIELD

Embodiments of the present disclosure generally relate to wireless communication technology, and more particularly to multicast transmissions.

BACKGROUND

Wireless communication systems are widely deployed to provide various telecommunication services such as telephony, video, data, messaging, broadcasts, and so on. Wireless communication systems may employ multiple access technologies capable of supporting communication with multiple users by sharing available system resources (e.g., time, frequency, and power). Examples of wireless communication systems may include fourth generation (4G) systems such as long term evolution (LTE) systems, LTE-advanced (LTE-A) systems, or LTE-A Pro systems, and fifth generation (5G) systems which may also be referred to as new radio (NR) systems.

A wireless communication system may support multicast and broadcast services (MBSs). One or more user equipment (UE) may be grouped as a MBS group and may receive multicast transmissions from a base station (BS).

There is a need for handling DL scheduling for multicast transmission in a wireless communication system.

SUMMARY

Some embodiments of the present disclosure provide a method for wireless communication performed by a user equipment (UE). The method may include: receiving a downlink control information (DCI) format for scheduling a physical downlink shared channel (PDSCH); determining, based on the DCI format, whether the PDSCH is scheduled for a group of UEs including the UE or specifically for the UE; and decoding the scheduled PDSCH.

Some embodiments of the present disclosure provide a method for wireless communication performed by a base station (BS). The method may include: determining whether to transmit data specifically to a first user equipment (UE) or to a group of UEs including the first UE; generating a downlink control information (DCI) format for scheduling a physical downlink shared channel (PDSCH), wherein the PDSCH carries the data; and transmitting the DCI format and the scheduled PDSCH.

Some embodiments of the present disclosure provide an apparatus. According to some embodiments of the present disclosure, the apparatus may include: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry, wherein the at least one non-transitory computer-readable medium and the computer executable instructions may be configured to, with the at least one processor, cause the apparatus to perform a method according to some embodiments of the present disclosure.

BRIEF DESCRIPTION OF THE DRAWINGS

In order to describe the manner in which the advantages and features of the disclosure can be obtained, a description of the disclosure is rendered by reference to specific embodiments thereof, which are illustrated in the appended drawings. These drawings depict only exemplary embodiments of the disclosure and are not therefore to be considered limiting of its scope.

DETAILED DESCRIPTION

The detailed description of the appended drawings is intended as a description of the preferred embodiments of the present disclosure and is not intended to represent the only form in which the present disclosure may be practiced. It should be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as the 3rd generation partnership project (3GPP) 5G (NR), 3GPP long-term evolution (LTE) Release 8, and so on. It is contemplated that along with the developments of network architectures and new service scenarios, all embodiments in the present disclosure are also applicable to similar technical problems; and moreover, the terminologies recited in the present disclosure may change, which should not affect the principles of the present disclosure.

Figure 1:
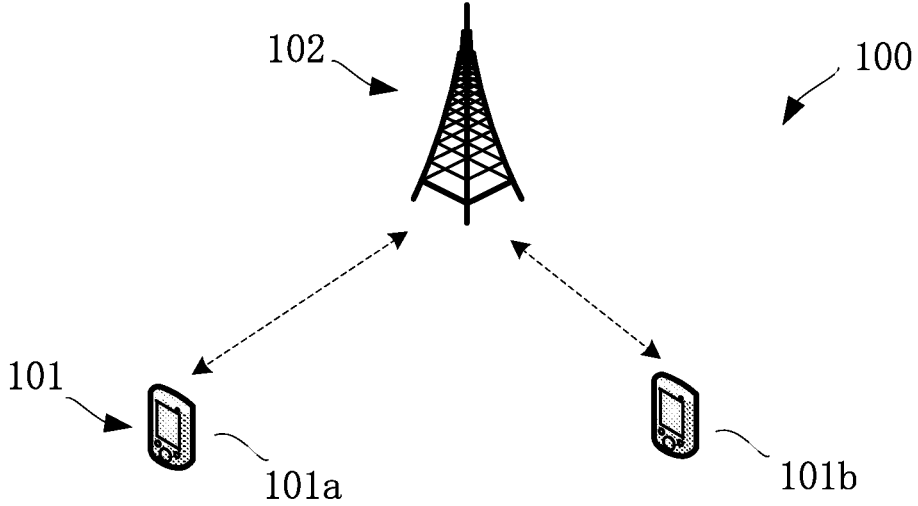
FIG. 1 illustrates a schematic diagram of a wireless communication system in accordance with some embodiments of the present disclosure.

FIG. 1 illustrates a schematic diagram of a wireless communication system 100 in accordance with some embodiments of the present disclosure.

As shown in FIG. 1, a wireless communication system 100 may include some UEs 101 (e.g., UE 101a and UE 101b) and a base station (e.g., BS 102). Although a specific number of UEs 101 and BS 102 are depicted in FIG. 1, it is contemplated that any number of UEs and BSs may be included in the wireless communication system 100.

The UE(s) 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to some embodiments of the present disclosure, the UE(s) 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present disclosure, the UE(s)

101 includes wearable devices, such as smart watches, fitness bands, optical head-mounted displays, or the like. Moreover, the UE(s) 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE(s) 101 may communicate with the BS 102 via uplink (UL) communication signals.

The BS 102 may be distributed over a geographic region. In certain embodiments of the present disclosure, the BS 102 may also be referred to as an access point, an access terminal, a base, a base unit, a macro cell, a Node-B, an evolved Node B (eNB), a gNB, a Home Node-B, a relay node, or a device, or described using other terminology used in the art. The BS 102 is generally a part of a radio access network that may include one or more controllers communicably coupled to one or more corresponding BSs 102. The BS 102 may communicate with UE(s) 101 via downlink (DL) communication signals.

The wireless communication system 100 may be compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

In some embodiments of the present disclosure, the wireless communication system 100 is compatible with 5G NR of the 3GPP protocol. For example, BS 102 may transmit data using an orthogonal frequency division multiple (OFDM) modulation scheme on the DL and the UE(s) 101 may transmit data on the UL using a discrete Fourier transform-spread-orthogonal frequency division multiplexing (DFT-S-OFDM) or cyclic prefix-OFDM (CP-OFDM) scheme. More generally, however, the wireless communication system 100 may implement some other open or proprietary communication protocols, for example, WiMAX, among other protocols.

In some embodiments of the present disclosure, the BS 102 and UE(s) 101 may communicate using other communication protocols, such as the IEEE 802.11 family of wireless communication protocols. Further, in some embodiments of the present disclosure, the BS 102 and UE(s) 101 may communicate over licensed spectrums, whereas in some other embodiments, the BS 102 and UE(s) 101 may communicate over unlicensed spectrums. The present disclosure is not intended to be limited to the implementation of any particular wireless communication system architecture or protocol.

In some embodiments of the present disclosure, the wireless communication system 100 may support multicast and broadcast services (MBSs). For example, one or more UEs (e.g., UE 101*a* and UE 101*b*) may be grouped as a MBS group to receive MBSs (e.g., a MBS PDSCH) from a BS (e.g., BS 102). Several transmission schemes including, but not limited to, the following three transmission schemes may be applied for multicast transmission: a point-to-point (PTP) transmission scheme, point-to-multipoint (PTM) transmission scheme 1, and PTM transmission scheme 2.

Under the PTP transmission scheme, RRC_CONNECTED UEs may use a UE-specific PDCCH with a cyclic redundancy check (CRC) scrambled by a UE-specific radio network temporary identifier (RNTI) (e.g., cell-RNTI (C-RNTI)) to schedule a UE-specific PDSCH which is scrambled by the same UE-specific RNTI.

Under PTM transmission scheme 1, RRC_CONNECTED UEs in the same MBS group may use a group-common PDCCH with a cyclic redundancy check (CRC) scrambled by a group-common radio network temporary identifier (RNTI) to schedule a group-common PDSCH which is scrambled by the same group-common RNTI. This scheme may also be referred to as a group-common PDCCH based group scheduling scheme. The group-common RNTI may be configured via RRC signaling.

Under PTM transmission scheme 2, RRC_CONNECTED UEs in the same MBS group may use a UE-specific PDCCH with a CRC scrambled by a UE-specific RNTI (e.g., cell-RNTI) to schedule a group-common PDSCH which is scrambled by a group-common RNTI. This scheme may also be referred to as a UE-specific PDCCH based group scheduling scheme.

The "group-common PDCCH/PDSCH" may mean that the PDCCH or PDSCH is transmitted in a common time and/or frequency resources, and can be identified by all the UEs in the same MBS group. The "UE-specific PDCCH/PDSCH" may mean that the PDCCH or PDSCH can only be identified by the target UE, but cannot be identified by other UEs in the same MBS group with the target UE.

In some embodiments of the present disclosure, for RRC-_CONNECTED UEs, when an initial transmission for multicast is based on PTM transmission scheme 1, the wireless communication system 100 may at least support retransmission(s) using PTM transmission scheme 1.

For the multicast of RRC_CONNECTED UEs, a common frequency resource for a group-common PDCCH/PDSCH may be confined within the frequency resource of a dedicated unicast bandwidth part (BWP) to support simultaneous unicast and multicast receptions in the same slot. The following options may be supported for the common frequency resource for a group-common PDCCH/PDSCH.

The first option (also referred to as "Option 2A") is that the common frequency resource may be defined as an MBS specific BWP. The MBS specific BWP may be associated with the dedicated unicast BWP and using the same numerology (e.g., sub-carrier spacing (SCS) and cyclic prefix (CP)).

The second option (also referred to as "Option 2B") is that the common frequency resource may be defined as an MBS frequency region with a number of contiguous physical resource blocks (PRBs). The MBS frequency region is configured within the dedicated unicast BWP.

Among the above three transmission schemes for multicast transmission for RRC connected UEs, i.e., PTP transmission scheme, PTM transmission scheme 1 and PTM transmission scheme 2, the CRC of a DCI format under either PTP transmission scheme or PTM transmission scheme 2 is scrambled by, for example, a C-RNTI, and the CRC of a DCI format under PTM transmission scheme 1 is scrambled by, for example, a G-RNTI. Therefore, in response to the detection of a DCI format scheduling a PDSCH carrying a MBS, a UE can identify that the adopted transmission scheme is PTM transmission scheme 1 if the CRC of the DCI is scrambled by, for example, a G-RNTI, and the scheduled PDSCH is a group-common PDSCH scrambled by the G-RNTI. The UE thus can decode the scheduled PDSCH.

For example, the scrambling sequence generator for a PDSCH may be initialized with the following equation:

$$c_{init} = n_{RNTI} \cdot 2^{15} + q \cdot 2^{14} + n_{ID} \tag{1}$$

In the above equation, q denotes the codeword index. $q \in \{0, 1\}$ when up to two codewords can be transmitted. In the case of single-codeword transmission, q=0. $n_{RNTI}$ denotes the RNTI associated with the PDSCH transmission. $n_{ID} \in \{0, 1, \ldots, 1023\}$ equals the higher-layer parameter dataScramblingIdentityPDSCH, if configured, the RNTI may be a C-RNTI, a modulation and coding scheme (MCS) C-RNTI (MCS-C-RNTI), or a configured scheduling RNTI (CS-RNTI), and the transmission is not scheduled using DCI format 1_0 in a common search space; or $$n_{ID} = N_{ID}^{cell}$$

(i.e., physical layer cell identity) otherwise.

However, if the CRC of the DCI is scrambled by, for example, a C-RNTI, the UE cannot determine whether the adopted transmission scheme is PTP transmission scheme or PTM transmission scheme 2. Accordingly, the UE cannot recognize whether the schedule PDSCH is a group-common PDSCH or a UE-specific PDSCH. As a result, the UE cannot know whether the scheduled PDSCH is scrambled by a C-RNTI or a G-RNTI. Without this information, the UE cannot decode the scheduled PDSCH, for example, according to equation (1).

To solve the above issues, two different DCI formats for PTP transmission scheme and PTM transmission scheme 2 may be used in some embodiments of the present disclosure. However, this solution may increase the PDCCH blind detection effort. In addition, the DCI payload size threshold may also be exceeded.

Embodiments of the present disclosure provide solutions to solve the above issues. For example, solutions for DL scheduling for multicast transmission are proposed. With the proposed solutions, a UE can identify the transmission scheme applied to a DL transmission (e.g., PDSCH), and thus can successfully decode the DL transmission. More details on the embodiments of the present disclosure will be illustrated in the following text in combination with the appended drawings.

In some embodiments of the present disclosure, the CRCs of the DCI formats under different transmission schemes may be scrambled by different RNTIs. For example, the CRCs of the DCI formats under PTP transmission scheme and PTM transmission scheme 2 may be scrambled by different UE-specific RNTIs. In addition, as stated above, the CRC of the DCI format under PTM transmission scheme 1 may be scrambled by a group-common RNTI.

In this way, based on the CRCs of the DCI formats, the UE can distinguish the transmission schemes employed (e.g., PTP transmission scheme, PTM transmission scheme 1, and PTM transmission scheme 2), and can decode the scheduled PDSCH accordingly.

In some embodiments of the present disclosure, a UE may be configured with a maximum number (e.g., 16) of HARQ processes for DL transmissions via, for example, an RRC message. The UE may be configured with a set of HARQ process numbers only for multicast transmission, broadcast transmission, or both (e.g., data is transmitted by a BS to a group of UEs including the UE). For example, a set of HARQ process numbers may be configured only for PTM transmission scheme 1 or PTM transmission scheme 2.

In response to receiving a DCI format with a CRC scrambled by a UE-specific RNTI (e.g., C-RNTI), a UE may determine whether the HARQ process number indicated in the DCI format is included in the set of HARQ process numbers configured only for multicast transmission and/or broadcast transmission.

In the case that the indicated HARQ process number is within the set of HARQ process numbers configured only for multicast transmission and/or broadcast transmission, the UE may determine that this DCI format schedules a PDSCH for transmitting data to a group of UEs (e.g., PTM transmission scheme 2) and the scheduled PDSCH is scrambled by a group-common RNTI (e.g., G-RNTI for MBS). The UE may then determine a scrambling sequence for decoding the scheduled PDSCH based on the group-common RNTI (e.g., G-RNTI).

In the case that the indicated HARQ process number is not within the set of HARQ process numbers configured only for multicast transmission and/or broadcast transmission, the UE may determine that this DCI format schedules a PDSCH specifically for the UE (e.g., PTP transmission) and the scheduled PDSCH is scrambled by a UE-specific RNTI (e.g., C-RNTI). The UE may then determine a scrambling sequence for decoding the scheduled PDSCH based on the UE-specific RNTI (e.g., C-RNTI).

In this way, based on the indicated HARQ process number in the DCI format, the UE can distinguish the transmission schemes employed (e.g., PTP transmission scheme and PTM transmission scheme 2), and can decode the scheduled PDSCH accordingly.

For example, it is assumed that 16 DL HARQ processes are configured to a UE, and may be numbered by "0, 1, 2, . . . , 15." A set of DL HARQ process numbers, e.g., {14, 15}, is configured only for multicast transmission, broadcast transmission, or both. In other words, DL HARQ process numbers from 0 to 13 are used only for unicast transmission. In response to receiving a DCI format with a CRC scrambled by a UE-specific RNTI (e.g., C-RNTI), when the indicated HARQ process number is within the set of {14, 15}, the UE may determine that this DCI format schedules a PDSCH for multicast or broadcast transmission (e.g., PTM transmission scheme 2) and the scheduled PDSCH is scrambled by a group-common RNTI (e.g., G-RNTI for MBS). When the indicated HARQ process number is within the set of 0 to 13, the UE may determine that this DCI format schedules a PDSCH for unicast transmission (e.g., PTP transmission) and the scheduled PDSCH is scrambled by the UE-specific RNTI (e.g., C-RNTI).

A common frequency resource may be configured by RRC signaling to a group of UEs for multicast/broadcast transmission (e.g., PTM transmission scheme 1 or PTM transmission scheme 2). The group-common DCI format (e.g., the DCI format with a CRC scrambled by a group-common RNTI such as G-RNTI), and the scheduled group-common PDSCH may be transmitted within the configured common frequency resource. The UE-specific DCI format (e.g., the DCI format with a CRC scrambled by a UE-specific RNTI such as C-RNTI) may be transmitted within the unicast DL BWP.

From a UE's perspective, the common frequency resource is configured to be confined within the associated dedicated unicast DL BWP of the UE, so as to support simultaneous unicast and multicast receptions in the same slot. That is to say, the common frequency resource is a part of the associated DL BWP.

In some embodiments of the present disclosure, to facilitate distinguishing the transmission schemes employed, from a BS's perspective, when the BS determines to transmit DL data to a group of UEs, the BS may make sure that the frequency resource indicated in the DCI format scheduling the DL data to the group of UEs (e.g., PTM transmission scheme 2) is fully contained within the common frequency region. When the BS determines to transmit DL data specifically to a UE, the BS may make sure that the frequency resource indicated in the DCI format scheduling the DL data specifically to the UE (e.g., PTP transmission scheme) is not fully contained within or outside the common frequency region.

At a UE side, in response to receiving a DCI format with a CRC scrambled by a UE-specific RNTI (e.g., C-RNTI), when the frequency resource allocated to the PDSCH scheduled by this DCI format is fully contained within the common frequency resource configured for multicast/broadcast transmission, the UE may determine that this DCI format schedules a PDSCH for multicast/broadcast (e.g., PTM transmission scheme 2) and the scheduled PDSCH is scrambled by a group-common RNTI (e.g., G-RNTI for MBS). The UE may then determine a scrambling sequence for decoding the scheduled PDSCH based on the group-common RNTI (e.g., G-RNTI).

When the frequency resource allocated to the PDSCH scheduled by this DCI format is not fully contained within or outside the common frequency resource configured for multicast/broadcast transmission, the UE may determine that this DCI format schedules a PDSCH for unicast (e.g., PTP transmission) and the scheduled PDSCH is scrambled by the UE-specific RNTI (e.g., C-RNTI). The UE may then determine a scrambling sequence for decoding the scheduled PDSCH based on the UE-specific RNTI (e.g., C-RNTI).

In this way, based on the allocated frequency resource in a DCI format, the UE can distinguish the transmission schemes employed (e.g., PTP transmission scheme and PTM transmission scheme 2), and can decode the scheduled PDSCH accordingly.

Figure 2:
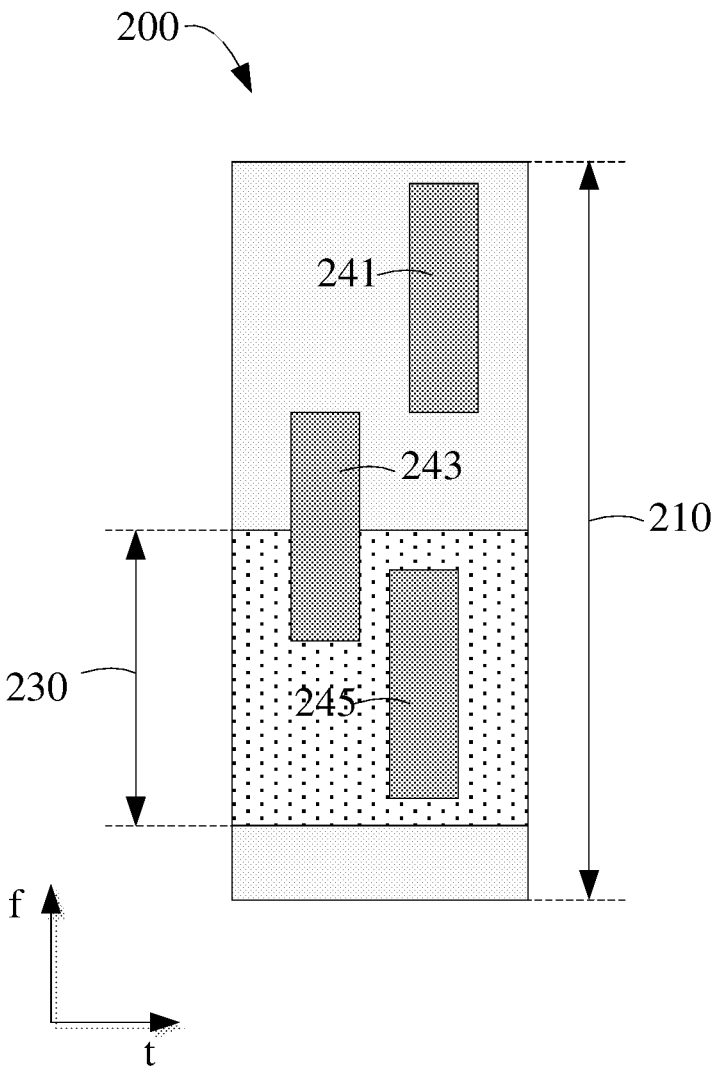
FIG. 2 illustrates exemplary radio resource allocation in accordance with some embodiments of the present disclosure.

FIG. 2 illustrates exemplary radio resource allocation 200 in accordance with some embodiments of the present disclosure. In FIG. 2, a UE is configured with a DL BWP 210. Region 230 within the DL BWP 210 is configured as the common frequency resource for MBS reception.

In response to receiving a DCI format with a CRC scrambled by a UE-specific DCI format (e.g., C-RNTI), when the frequency resource allocated to a PDSCH scheduled by the DCI format is fully within region 230 (e.g., the DCI format schedules PDSCH 245), the UE may determine that this DCI format schedules a PDSCH for multicast/broadcast transmission (e.g., PTM transmission scheme 2) and the scheduled PDSCH is scrambled by a group-common RNTI (e.g., G-RNTI for MBS).

The above solutions can facilitate distinguishing the employed transmission schemes while not introducing new DCI formats or revising the existing DCI formats. In addition, blind decoding effort is not increased at a UE.

When the allocated frequency resource of the scheduled PDSCH is not fully within (e.g., partially overlaps) region 230 (e.g., the DCI format schedules PDSCH 243), or outside region 230 (e.g., the DCI format schedules PDSCH 241), the UE may determine that this DCI format schedules a PDSCH for unicast (e.g., PTP transmission) and the scheduled PDSCH is scrambled by the UE-specific RNTI (e.g., C-RNTI).

In some embodiments of the present disclosure, a DCI format may include a field indicating the transmission type or the transmission scheme of the scheduled transmission.

In some embodiments, the DCI format may include a field indicating the transmission type of the scheduled transmission. The transmission type may be selected from a set of transmission types including two or more of a unicast transmission type, a multicast transmission type, and a broadcast transmission type. The number of bits for the transmission type field depends on the number of transmission types in the set of transmission types.

In some examples, the set of transmission types may include two transmission types, for example, a unicast transmission type and a multicast transmission type, or a unicast transmission type and a non-unicast transmission type. The transmission type field in the DCI format may have 1 bit. In some other examples, the set of transmission types may include three transmission types, for example, a unicast transmission type, a multicast transmission type, and a broadcast transmission type. The transmission type field in the DCI format may have 2 bits.

At a UE side, in response to receiving a DCI format with a CRC scrambled by a UE-specific DCI format (e.g., C-RNTI), if the transmission type field indicates multicast, broadcast or non-unicast, the UE may determine that this DCI format schedules a PDSCH for multicast or broadcast, and the scheduled PDSCH is scrambled by the RRC configured group-common RNTI (e.g., G-RNTI for MBS). The UE may then determine a scrambling sequence for decoding the scheduled PDSCH based on the group-common RNTI (e.g., G-RNTI).

Otherwise, if the transmission type field indicates unicast, the UE may determine that this DCI format schedules a PDSCH for unicast (e.g., PTP transmission) and the scheduled PDSCH is scrambled by the UE-specific RNTI (e.g., C-RNTI). The UE may then determine a scrambling sequence for decoding the scheduled PDSCH based on the UE-specific RNTI (e.g., C-RNTI).

In this way, based on the transmission type field in the DCI format, the UE can distinguish the transmission schemes employed (e.g., PTP transmission scheme and PTM transmission scheme 2), and can decode the scheduled PDSCH accordingly.

In some embodiments, the DCI format may include a field indicating the transmission scheme of the scheduled transmission. The transmission scheme may be selected from a set of transmission schemes. Each transmission scheme of the set of transmission schemes may be associated with an RNTI for decoding an associated PDSCH.

The set of transmission schemes may include two or more of PTP transmission scheme 1, PTP transmission scheme 2, PTP transmission scheme 3, PTM transmission scheme 1, PTM transmission scheme 2, PTM transmission scheme 3, broadcast, or other transmission schemes. The number of bits for the transmission scheme field depends on the number of transmission schemes in the set of transmission schemes. The definitions of the above transmission schemes are listed below, among which the definitions of PTM transmission scheme 1 and PTM transmission scheme are the same as those stated above.

PTP transmission scheme 1: For RRC_CONNECTED UEs, use a UE-specific PDCCH with a CRC scrambled by a UE-specific RNTI (e.g., C-RNTI) to schedule a UE-specific PDSCH which is scrambled with the same UE-specific RNTI.

PTP transmission scheme 2: For RRC_CONNECTED UEs, use a UE-specific PDCCH in a UE-specific search space (USS) with a CRC scrambled by a group-common RNTI (e.g., G-RNTI) to schedule a UE-specific PDSCH which is scrambled with the same group-common RNTI.

PTP transmission scheme 3: For RRC_CONNECTED UEs, use UE-specific PDCCH in a USS with a CRC scrambled by a group-common RNTI (e.g., G-RNTI) to schedule a UE-specific PDSCH which is scrambled with the UE-specific RNTI (e.g., C-RNTI).

PTM transmission scheme 1: For RRC_CONNECTED UEs in the same MBS group, use a group-common PDCCH with a CRC scrambled by a group-common RNTI (e.g., G-RNTI) to schedule a group-common PDSCH which is scrambled with the same group-common RNTI.

PTM transmission scheme 2: For RRC_CONNECTED UEs in the same MBS group, use a UE-specific PDCCH with a CRC scrambled by a UE-specific RNTI (e.g., C-RNTI) to schedule a group-common PDSCH which is scrambled with a group-common RNTI (e.g., G-RNTI).

PTM transmission scheme 3: For RRC_CONNECTED UEs in the same MBS group, use a UE-specific PDCCH in a USS with a CRC scrambled by a group-common RNTI (e.g., G-RNTI) to schedule a group-common PDSCH which is scrambled with the same group-common RNTI.

At a UE side, in response to receiving a DCI format, based on the field for transmission scheme indication, the UE may determine the adopted transmission scheme and the RNTI for scrambling the scheduled PDSCH. For example, the UE may determine whether a group-common RNTI (e.g., G-RNTI for MBS) or a UE-specific RNTI (e.g., C-RNTI) is used for scrambling the scheduled PDSCH. The UE may then determine a scrambling sequence for decoding the scheduled PDSCH based on the corresponding RNTI (e.g., G-RNTI or C-RNTI).

In this way, based on the transmission scheme field in the DCI format, the UE can distinguish the transmission schemes employed (e.g., PTP transmission scheme and PTM transmission scheme 2), and can decode the scheduled PDSCH accordingly.

Figure 3:
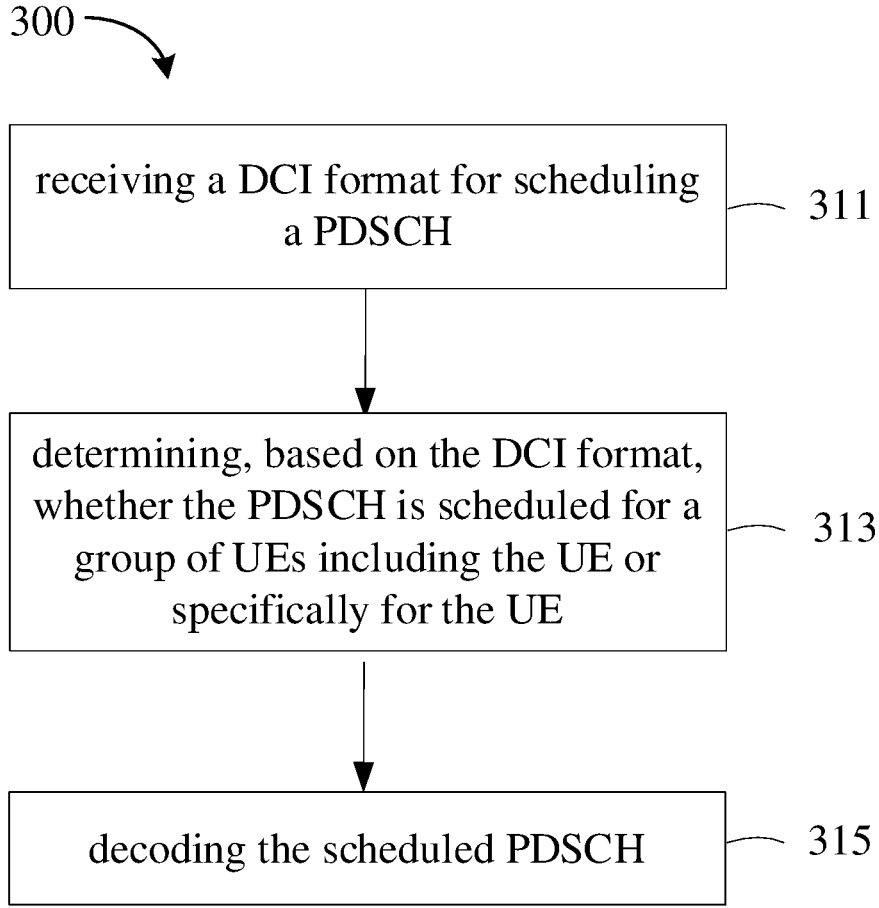
FIG. 3 illustrates a flow chart of an exemplary procedure of wireless communications in accordance with some embodiments of the present disclosure.

FIG. 3 illustrates a flow chart of an exemplary procedure 300 for wireless communications in accordance with some embodiments of the present disclosure. Details described in all of the foregoing embodiments of the present disclosure are applicable for the embodiments shown in FIG. 3. In some examples, the procedure may be performed by a UE, for example, UE 101 in FIG. 1.

Referring to FIG. 3, in operation 311, a UE may receive a DCI format for scheduling a PDSCH. In operation 313, the UE may determine, based on the DCI format, whether the PDSCH is scheduled for a group of UEs including the UE or specifically for the UE.

For example, in some embodiments of the present disclosure, the UE may receive RRC signaling for configuring a set of HARQ process numbers for multicast transmission and/or broadcast, for example, for a BS transmitting data to the group of UEs including the UE. The DCI format may indicate a HARQ process number for the scheduled PDSCH. The UE may determine whether the PDSCH is scheduled for a group of UEs including the UE or specifically for the UE based on the HARQ process number indicated by the DCI format.

For instance, the UE may determine that the PDSCH is scheduled for the group of UEs including the UE in response to the HARQ process number indicated by the DCI format being included in the set of HARQ process numbers. The UE may determine that the PDSCH is scheduled specifically for the UE in response to the HARQ process number indicated by the DCI format not being included in the set of HARQ process numbers.

In some embodiments of the present disclosure, the UE may receive RRC signaling for configuring a common frequency region for the group of UEs including the UE. The DCI format may indicate a frequency resource for the scheduled PDSCH. The UE may determine whether the PDSCH is scheduled for a group of UEs including the UE or specifically for the UE based on the frequency resource for the scheduled PDSCH indicated by the DCI format.

For instance, the UE may determine that the PDSCH is scheduled for the group of UEs including the UE in response to the frequency resource indicated by the DCI format being fully contained within the common frequency region. The UE may determine that the PDSCH is scheduled specifically for the UE in response to the frequency resource indicated by the DCI format being partly contained within or outside the common frequency region.

In operation 315, the UE may decode the scheduled PDSCH.

For example, in response to the PDSCH being scheduled for the group of UEs including the UE, the UE may determine a scrambling sequence for decoding the scheduled PDSCH based on a common RNTI for the group of UEs (e.g., G-RNTI). In response to the PDSCH being scheduled specifically for the UE, the UE may determine the scrambling sequence based on an RNTI specific for the UE (e.g., C-RNTI).

In some embodiments of the present disclosure, the DCI format may indicate a transmission type of the scheduled PDSCH. The transmission type indicated by the DCI format may be selected from a set of transmission types including two or more of a unicast transmission type, a multicast transmission type, and a broadcast transmission type.

In response to the transmission type indicated by the DCI format being a multicast or broadcast transmission type, the UE may determine a scrambling sequence for decoding the scheduled PDSCH based on a common RNTI for the multicast or broadcast transmission type (e.g., G-RNTI). In response to the transmission type indicated by the DCI format being unicast transmission type, the UE may determine the scrambling sequence based on an RNTI specific for the UE (e.g., C-RNTI).

In some embodiments of the present disclosure, the DCI format may indicate a transmission scheme of the scheduled PDSCH. The transmission scheme of the scheduled PDSCH may be selected from a set of transmission schemes. Each transmission scheme of the set of transmission schemes may be associated with an RNTI for decoding an associated PDSCH. The UE may determine a scrambling sequence for decoding the scheduled PDSCH based on an RNTI associated with the transmission scheme indicated by the DCI format.

It should be appreciated by persons skilled in the art that the sequence of the operations in exemplary procedure 300 may be changed and some of the operations in exemplary procedure 300 may be eliminated or modified, without departing from the spirit and scope of the disclosure.

Figure 4:
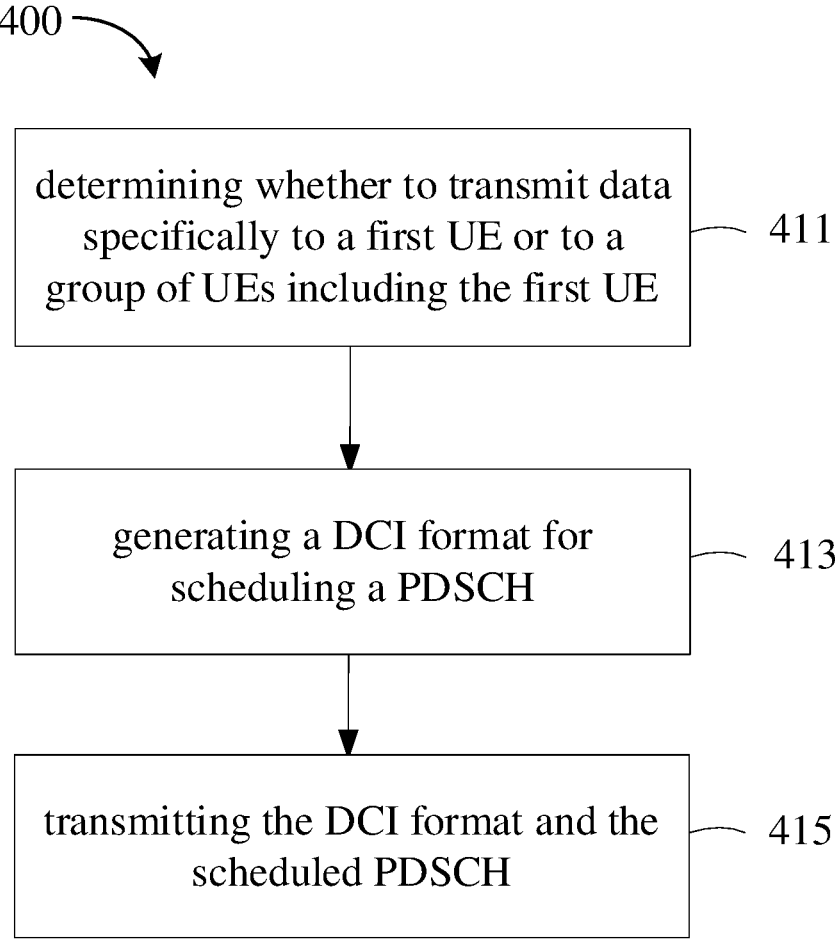
FIG. 4 illustrates a flow chart of an exemplary procedure of wireless communications in accordance with some embodiments of the present disclosure.

FIG. 4 illustrates a flow chart of an exemplary procedure 400 for wireless communications in accordance with some embodiments of the present disclosure. Details described in all of the foregoing embodiments of the present disclosure are applicable for the embodiments shown in FIG. 4. In some examples, the procedure may be performed by a BS, for example, BS 102 in FIG. 1.

Referring to FIG. 4, in operation 411, a BS may determine whether to transmit data specifically to a first UE or to a group of UEs including the first UE. In operation 413, the BS may generate a DCI format for scheduling a PDSCH. The PDSCH may carry the data.

In some embodiments of the present disclosure, the BS may transmit RRC signaling for configuring a set of HARQ process numbers for transmitting data to the group of UEs. The DCI format may indicate a HARQ process number for the scheduled PDSCH. In response to determining to transmit the data to the group of UEs including the first UE, the HARQ process number indicated by the DCI format may be included in the set of HARQ process numbers. In response to determining to transmit the data specifically to the first UE, the HARQ process number indicated by the DCI format may not be included in the set of HARQ process numbers.

In some embodiments of the present disclosure, the BS may transmit RRC signaling for configuring a common frequency region for the group of UEs including the first UE. The DCI format may indicate a frequency resource for the scheduled PDSCH. In response to determining to transmit the data to the group of UEs including the first UE, the frequency resource indicated by the DCI format may be fully contained within the common frequency region. In response to determining to transmit the data specifically to the first UE, the frequency resource indicated by the DCI format may be partly contained within or outside the common frequency region.

In some embodiments of the present disclosure, in response to determining to transmit the data to the group of UEs including the first UE, the BS may scramble the scheduled PDSCH based on a common RNTI configured for the group of UEs. In response to determining to transmit the data specifically to the first UE, the BS may scramble the scheduled PDSCH based on an RNTI configured specifically for the first UE.

In some embodiments of the present disclosure, the DCI format may indicate a transmission type of the scheduled PDSCH. The transmission type indicated by the DCI format may be selected from a set of transmission types including two or more of a unicast transmission type, a multicast transmission type, and a broadcast transmission type.

In response to determining to transmit the data to the group of UEs including the first UE, the BS may indicate a multicast or broadcast transmission type in the DCI format and may scramble the scheduled PDSCH based on a common RNTI configured for the group of UEs (e.g., G-RNTI). In response to determining to transmit the data specifically to the first UE, the BS may indicate a unicast transmission type in the DCI format and may scramble the scheduled PDSCH based on an RNTI configured specifically for the first UE (e.g., C-RNTI).

In some embodiments of the present disclosure, the DCI format may indicate a transmission scheme of the scheduled PDSCH. The transmission scheme indicated by the DCI format may be selected from a set of transmission schemes. Each transmission scheme of the set of transmission schemes may be associated with an RNTI for decoding an associated PDSCH. The BS may scramble the scheduled PDSCH based on an RNTI associated with the transmission scheme indicated by the DCI format.

In operation 415, the BS may transmit the DCI format and the scheduled PDSCH.

It should be appreciated by persons skilled in the art that the sequence of the operations in exemplary procedure 400 may be changed and some of the operations in exemplary procedure 400 may be eliminated or modified, without departing from the spirit and scope of the disclosure.

Figure 5:
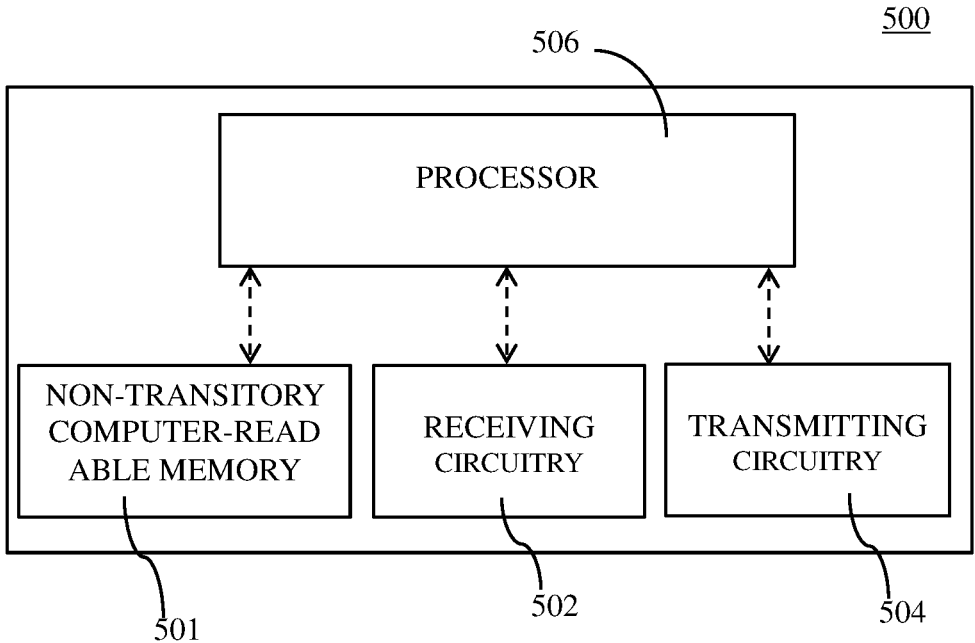
FIG. 5 illustrates a block diagram of an exemplary apparatus in accordance with some embodiments of the present disclosure.

FIG. 5 illustrates a block diagram of an exemplary apparatus 500 according to some embodiments of the present disclosure.

As shown in FIG. 5, the apparatus 500 may include at least one non-transitory computer-readable medium 501, at least one receiving circuitry 502, at least one transmitting circuitry 504, and at least one processor 506 coupled to the non-transitory computer-readable medium 501, the receiving circuitry 502 and the transmitting circuitry 504. The apparatus 500 may be a base station side apparatus (e.g., a BS) or a communication device (e.g., a UE).

Although in this figure, elements such as the at least one processor 506, transmitting circuitry 504, and receiving circuitry 502 are described in the singular, the plural is contemplated unless a limitation to the singular is explicitly stated. In some embodiments of the present application, the receiving circuitry 502 and the transmitting circuitry 504 are combined into a single device, such as a transceiver. In certain embodiments of the present application, the apparatus 500 may further include an input device, a memory, and/or other components.

In some embodiments of the present disclosure, the non-transitory computer-readable medium 501 may have stored thereon computer-executable instructions to cause a processor to implement the method with respect to the UEs as described above. For example, the computer-executable instructions, when executed, cause the processor 506 interacting with receiving circuitry 502 and transmitting circuitry 504, so as to perform the operations with respect to the UEs described in FIGS. 1-3.

In some embodiments of the present disclosure, the non-transitory computer-readable medium 501 may have stored thereon computer-executable instructions to cause a processor to implement the method with respect to the BSs as described above. For example, the computer-executable instructions, when executed, cause the processor 506 interacting with receiving circuitry 502 and transmitting circuitry 504, so as to perform the operations with respect to the BSs described in FIGS. 1, 2 and 4.

Those having ordinary skill in the art would understand that the operations or steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the operations or steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in other embodiments. Also, all of the elements of each figure are not necessary for the operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The term "having" and the like, as used herein, are defined as "including." Expressions such as "A and/or B" or "at least one of A and B" may include any and all combinations of words enumerated along with the expression. For instance, the expression "A and/or B" or "at least one of A and B" may include A, B, or both A and B. The wording "the first," "the second" or the like is only used to clearly illustrate the embodiments of the present application, but is not used to limit the substance of the present application.

What is claimed is:

1. A user equipment (UE) for wireless communication, comprising:
  at least one memory; and
  at least one processor coupled with the at least one memory and configured to cause the UE to:
    receive a downlink control information (DCI) format for scheduling a physical downlink shared channel (PDSCH), the DCI format indicating a hybrid automatic repeat request (HARQ) process number or a frequency resource for the scheduled PDSCH;
    determine whether the PDSCH is scheduled for a group of UEs including the UE or specifically for the UE based on:
      whether the HARQ process number is included in a set of HARQ process numbers associated with the group of UEs; or
      whether the frequency resource is fully contained within a common frequency region associated with the group of UEs; and
    decode the scheduled PDSCH.

2. The UE of claim 1, wherein the at least one processor is configured to cause the UE to:
  receive radio resource control (RRC) signaling for configuring the set of HARQ process numbers for transmitting data to the group of UEs including the UE.

3. The UE of claim 1, wherein to determine, based on the DCI format, whether the PDSCH is scheduled for the group of UEs including the UE or specifically for the UE, the at least one processor is configured to cause the UE to:
  determine, in response to the HARQ process number indicated by the DCI format being included in the set of HARQ process numbers, that the PDSCH is scheduled for the group of UEs including the UE; and
  determine, in response to the HARQ process number indicated by the DCI format not being included in the set of HARQ process numbers, that the PDSCH is scheduled specifically for the UE.

4. The UE of claim 1, wherein the at least one processor is configured to cause the UE to:
  receive radio resource control (RRC) signaling for configuring the common frequency region for the group of UEs including the UE.

5. The UE of claim 1, wherein to determine whether the PDSCH is scheduled for the group of UEs including the UE or specifically for the UE, the at least one processor is configured to cause the UE to:
  determine, in response to the frequency resource indicated by the DCI format being fully contained within the common frequency region, that the PDSCH is scheduled for the group of UEs including the UE; and
  determine, in response to the frequency resource indicated by the DCI format being partly contained within or outside the common frequency region, that the PDSCH is scheduled specifically for the UE.

6. The UE of claim 5, wherein the at least one processor is configured to cause the UE to:
  determine, in response to the PDSCH being scheduled for the group of UEs including the UE, a scrambling sequence for decoding the scheduled PDSCH based on a common radio network temporary identifier (RNTI) for the group of UEs; and
  determine, in response to the PDSCH being scheduled specifically for the UE, the scrambling sequence based on an RNTI specific for the UE.

7. The UE of claim 1, wherein the DCI format indicates a transmission type of the scheduled PDSCH.

8. The UE of claim 7, wherein the transmission type indicated by the DCI format is selected from a set of transmission types including two or more of a unicast transmission type, a multicast transmission type, or a broadcast transmission type.

9. The UE of claim 7, wherein the at least one processor is configured to cause the UE to:
  determine, in response to the transmission type indicated by the DCI format being a multicast or broadcast transmission type, a scrambling sequence for decoding the scheduled PDSCH based on a common radio network temporary identifier (RNTI) for the multicast or broadcast transmission type; and
  determine, in response to the transmission type indicated by the DCI format being unicast transmission type, the scrambling sequence based on an RNTI specific for the UE.

10. The UE of claim 1, wherein the DCI format indicates a transmission scheme of the scheduled PDSCH.

11. The UE of claim 10, wherein the transmission scheme of the scheduled PDSCH is selected from a set of transmission schemes, and each of the set of transmission schemes is associated with a radio network temporary identifier (RNTI) for decoding an associated PDSCH.

12. The UE of claim 10, wherein the at least one processor is configured to cause the UE to:
  determine a scrambling sequence for decoding the scheduled PDSCH based on a radio network temporary identifier (RNTI) associated with the transmission scheme indicated by the DCI format.

13. A method performed by a user equipment (UE), the method comprising:
  receiving a downlink control information (DCI) format for scheduling a physical downlink shared channel (PDSCH), the DCI format indicating a hybrid automatic repeat request (HARQ) process number or a frequency resource for the scheduled PDSCH;
  determining whether the PDSCH is scheduled for a group of UEs including the UE or specifically for the UE based on:
    whether the HARQ process number is included in a set of HARQ process numbers associated with the group of UEs; or whether the frequency resource is fully contained within a common frequency region associated with the group of UEs; and decoding the scheduled PDSCH.

14. The method of claim 13, further comprising:

receiving radio resource control (RRC) signaling for configuring the set of HARQ process numbers for transmitting data to the group of UEs including the UE.

15. The method of claim 13, wherein determining whether the PDSCH is scheduled for the group of UEs including the UE or specifically for the UE comprises:

determining, in response to the HARQ process number indicated by the DCI format being included in the set of HARQ process numbers, that the PDSCH is scheduled for the group of UEs including the UE; and in response to the HARQ process number indicated by the DCI format not being included in the set of HARQ process numbers, determining that the PDSCH is scheduled specifically for the UE.

16. The method of claim 13, further comprising:

receiving radio resource control (RRC) signaling for configuring the common frequency region for the group of UEs including the UE.

17. The method of claim 13, wherein determining whether the PDSCH is scheduled for a group of UEs including the UE or specifically for the UE comprises:

determining, in response to the frequency resource indicated by the DCI format being fully contained within the common frequency region, that the PDSCH is scheduled for the group of UEs including the UE; and determine, in response to the frequency resource indicated by the DCI format being partly contained within or outside the common frequency region, that the PDSCH is scheduled specifically for the UE.

18. The method of claim 17, further comprising:

determining, in response to the PDSCH being scheduled for the group of UEs including the UE, a scrambling sequence for decoding the scheduled PDSCH based on a common radio network temporary identifier (RNTI) for the group of UEs; and determining, in response to the PDSCH being scheduled specifically for the UE, the scrambling sequence based on an RNTI specific for the UE.

19. The method of claim 13, further comprising:

determining, in response to a transmission type indicated by the DCI format being a multicast or broadcast transmission type, a scrambling sequence for decoding the scheduled PDSCH based on a common radio network temporary identifier (RNTI) for the multicast or broadcast transmission type; and determining, in response to the transmission type indicated by the DCI format being unicast transmission type, the scrambling sequence based on an RNTI specific for the UE.

20. A network entity for wireless communication, comprising:

at least one memory; and at least one processor coupled with the at least one memory and configured to cause the network entity to:

determine whether to transmit data to a first user equipment (UE) or to a group of UEs including the first UE based on:

a set of hybrid automatic repeat request (HARQ) process numbers associated with the group of UEs; or a common frequency region associated with the group of UEs;

generate a downlink control information (DCI) format for scheduling a physical downlink shared channel (PDSCH), the DCI format indicating a HARQ process number or a frequency resource for the scheduled PDSCH; and transmit the DCI format and the scheduled PDSCH to one or more of the first UE or the group of UEs including the first UE.

* * * * *